United States Patent
Woolmer et al.

(10) Patent No.: US 12,294,318 B2
(45) Date of Patent: May 6, 2025

(54) CONTROLLER FOR AN AXIAL FLUX MACHINE AND METHOD

(71) Applicant: YASA LIMITED, Kidlington (GB)

(72) Inventors: Tim Woolmer, Waterperry (GB); Richard Phillips, Banbury (GB)

(73) Assignee: YASA LIMITED, Kidlington (GB)

( * ) Notice: Subject to any disclaimer, the term of this patent is extended or adjusted under 35 U.S.C. 154(b) by 44 days.

(21) Appl. No.: 17/927,313

(22) PCT Filed: May 26, 2021

(86) PCT No.: PCT/EP2021/064120
§ 371 (c)(1),
(2) Date: Nov. 22, 2022

(87) PCT Pub. No.: WO2021/239849
PCT Pub. Date: Dec. 2, 2021

(65) Prior Publication Data
US 2023/0223878 A1    Jul. 13, 2023

(30) Foreign Application Priority Data

May 28, 2020 (GB) .................................. 2007999

(51) Int. Cl.
*H02P 21/05* (2006.01)
*H02K 11/20* (2016.01)
(Continued)

(52) U.S. Cl.
CPC .............. *H02P 21/05* (2013.01); *H02K 11/20* (2016.01); *H02K 21/24* (2013.01); *H02P 21/22* (2016.02)

(58) Field of Classification Search
CPC .......... H02P 21/05; H02P 21/22; H02K 21/24
See application file for complete search history.

(56) References Cited

U.S. PATENT DOCUMENTS 5,565,752 A * 10/1996 Jansen ................. H02K 17/165
310/201
6,069,467 A * 5/2000 Jansen .................... H02P 21/26
318/811
(Continued)

FOREIGN PATENT DOCUMENTS

| AU | 2015396604 B2 | 2/2019 |
| JP | 2012182862 A | 9/2012 |
| WO | 2012/022974 A1 | 2/2012 |

OTHER PUBLICATIONS

International Searching Authority (ISA/EP). International Search Report and Written Opinion. PCT Application No. PCT/EP2021/064120. Issued on Aug. 6, 2021. 14 pages.

(Continued)

*Primary Examiner* — Rina I Duda
(74) *Attorney, Agent, or Firm* — Meunier Carlin & Curfman LLC

(57) ABSTRACT

We describe a method and controller for controlling an axial flux machine in which an alternating current supplied to the plurality of coils injects a compensation current to reduce a mechanical resonant component of the rotor. The compensation current is a modulated current component added to at least one of the Quadrature Current (Iq) and Direct Current (Id) components (when the alternating current is represented as a vectored DC component), when the rotor is rotating over one or more ranges of rotational speeds. The modulated current component has an electrical frequency that varies over a range of frequencies between a first frequency and a second frequency depending on the rotational speed of the rotor, the range of frequencies including a frequency that is substantially the same as a fundamental mechanical resonant frequency of the rotor, and having a phase that is out of phase with the fundamental mechanical resonant frequency of the rotor.

22 Claims, 5 Drawing Sheets

(51) Int. Cl.
    H02K 21/24    (2006.01)
    H02P 21/22    (2016.01)

(56) References Cited

U.S. PATENT DOCUMENTS

| | | | |
|---|---|---|---|
| 8,378,598 B2* | 2/2013 | Kaneko | H02P 21/06 318/128 |
| 8,847,522 B2* | 9/2014 | Nashiki | H02P 25/092 318/701 |
| 2005/0231143 A1 | 10/2005 | Yoshinaga et al. | |
| 2008/0315818 A1 | 12/2008 | Fukushige | |
| 2009/0026999 A1 | 1/2009 | Atarashi | |
| 2009/0072640 A1 | 3/2009 | Tanaka | |
| 2015/0108938 A1 | 4/2015 | Laing et al. | |
| 2016/0126871 A1* | 5/2016 | Uematsu | H02P 21/0089 318/400.02 |
| 2019/0052211 A1 | 2/2019 | Nakai | |

OTHER PUBLICATIONS

Uk Intellectual Property Office. Search Report. Issued in GB Application No. 2007999.2. Nov. 20, 2020. 1 page.
Deng Wenzhe et al, "Axial Force and Vibroacoustic Analysis of External-Rotor Axial-Flux Motors", Mar. 1, 2018 (Mar. 1, 2018), vol. 65, No. 3, p. 2018-2030.
Ogidi O O et al, "Detection of static eccentricity faults in AFPM machine with asymmetric windings using vibration analysis", 2014 International Conference on Electrical Machines (ICEM), IEEE,Sep. 2, 2014 (Sep. 2, 2014), p. 1549-1554.

\* cited by examiner

CONTROLLER FOR AN AXIAL FLUX MACHINE AND METHOD

FIELD OF THE INVENTION

The present invention relates to a method of controlling an axial flux machine, a controller for an axial flux machine, and an axial flux machine. In particular, to a method, controller and machine having a reduced mechanical resonance.

BACKGROUND OF THE INVENTION

All structures have natural frequencies of vibration at which exciting forces cause amplification. This amplification occurs when the excitation frequency coincides with the natural frequency in a condition called resonance.

Rotating machines are particularly prone to resonance induced mechanical vibration which occurs when a natural frequency is at or close to an exciting frequency, such as rotor speed. For machinery-such as pumps, turbines, electric motors and generators—resonance can amplify small vibratory forces from machine operation, and severe sometimes destructive vibration levels can result.

With variable-speed drives, exciting frequencies change with motor speed and result in resonance each time exciting harmonic frequencies cross a natural resonance frequency. Strength of resonance varies with excitation amplitude and proximity to the natural frequency, as well as with, damping, mass, and stiffness of subject machine components associated with the natural frequency.

Natural resonance frequencies of rotating machines are a consideration in a machine's design and may be adjusted i.e. minimised and perhaps shifted in frequency according to material properties and design of key components, typically stators, rotors, and housings.

Nevertheless despite efforts to shift and minimise resonance through materials choice and mechanical design, its consequences of noise, vibration and harshness (NVH) are often a challenge to overcome in finished machines.

Once a machine's design is committed and thereby fundamental resonances fixed, there remains opportunity to further reduce impact of resonance by modifying excitation frequencies and strengths.

For variable speed axial flux machines it is usually rotors that present greatest risk of troublesome resonances because of their planar, disc-like shape which present several common modes of vibration.

It is the fundamental mode (0,1), f0, f01 and sometimes called the zeroth mode that is of prime interest in the present invention because this mode is easily excited. Though the invention may equally be applied to higher order natural resonant modes, the following descriptions and focus will be on affecting the fundamental mode of resonance. It will be understood these same techniques may be applied to higher order modes.

The fundamental mode of resonance and vibration has additional importance to axial flux machines because such machines are often power, and torque optimised by using stator to rotor airgaps of approximately 1 mm. Even at lower amplitudes noise from resonance induced vibration may become intrusive.

The principle of resonant vibration/noise suppression via application of countering currents is well known and has been applied to permanent magnet machines to reduce vibration and noise produced by interaction of permanent magnet rotors on opposing stator poles wherein rotor positions alternate between high and low energy states. Some examples include AU2015396604, which relates to flux-weakening to reduce cogging forces and thereby reduce excitation of resonance. US2005/0231143 teaches vibration reduction in stators of radial machines. US2008315818 teaches applying pairs of harmonic currents whose order differ by two to the sinusoidal fundamental wave. US2015108938 teaches applying a compensation current to counteract oscillations caused by asymmetries in the machine.

We have appreciated the need for improved suppression of planar resonances in axial flux motor rotors.

SUMMARY OF THE INVENTION

The present invention therefore provides a method of controlling an axial flux machine, a controller for an axial flux machine, and an axial flux machine in accordance with the independent claims appended hereto. Further advantageous embodiments are also provided by the dependent claims, also appended hereto.

In particular, we will describe a method of controlling an axial flux machine, the axial flux machine comprising a stator comprising a stator housing enclosing a plurality of stator pole pieces disposed circumferentially at intervals around an axis of the machine, each of the stator pole pieces having a set of coils wound therearound for generating a magnetic field; and a rotor comprising a set of permanent magnets and mounted for rotation about the axis of the machine, the rotor being spaced apart from the stator along the axis of the machine to define a gap between the stator and rotor and in which magnetic flux in the machine is generally in an axial direction, the method comprising: controlling an alternating current supplied to the plurality of coils to inject a compensation current for reducing a mechanical resonant component of the rotor, the compensation current being injected when the rotor is rotating over one or more ranges of rotational speeds, each of the one or more ranges of rotational speeds of the rotor including a respective determined rotational speed of the rotor, wherein the alternating current through each coil is represented as vectored direct current components comprising a Direct current ($I_d$) component and a Quadrature current ($I_q$) component that are orthogonal to one another, and wherein the compensation current comprises a modulated current component added to at least one of the Quadrature Current ($I_q$) and the Direct Current ($I_d$) components, the modulated current component having an electrical frequency that varies over a range of frequencies between a first frequency and a second frequency depending on the rotational speed of the rotor, the range of frequencies including a frequency that is substantially the same as a fundamental mechanical resonant frequency of the rotor; and a phase that is out of phase with the fundamental mechanical resonant frequency of the rotor.

By applying the above method, a reduction in the resonance in the rotor is observed.

The one or more respective determined rotational speeds of the rotor may be dependent on one or more respective mechanical resonant excitation orders of the rotor, for example one or more of the $12^{th}$, $18^{th}$, $36^{th}$ and $72^{nd}$ excitation orders. These orders are of interest for certain topologies of machine, for example an 18/12 topology. Other topologies may have other excitation orders that are of interest, for example for a 12/8 machine, the excitation orders may be $8^{th}$, $12^{th}$, $24^{th}$ and $48^{th}$ orders. For a 24/16 topology the $16^{th}$, $24^{th}$, $48^{th}$ and $96^{th}$ orders may be interest.

The one or more respective determined rotational speeds of the rotor may be defined by the relationship:

$$\text{determined\_rotational\_speed} = 60 * \frac{\text{rotor\_fundamental\_resonant\_frequency}}{\text{excitation\_order}}$$

Each of the ranges of rotational speed of the rotor may be based on a percentage change of the rotor fundamental mechanical resonant frequency for a given mechanical resonant excitation order of the rotor. The percentage change of the rotor fundamental mechanical resonant frequency may be ±1%, ±5%, ±10%, ±15% or ±20% of the rotor fundamental mechanical resonant frequency.

In each of the one or more ranges of rotational speeds of the rotor, an amplitude of the compensation current may be ramped between a lower amplitude and a peak amplitude over at least a portion of the range of rotational speeds of the rotor, and wherein the peak amplitude of the compensation current substantially coincides with the respective determined rotational speed of the rotor.

The method may also comprise: receiving vibration data from a vibration sensor, the vibration sensor detecting mechanical vibrations in the rotor; identifying a mechanical resonant component of the rotor from the vibration data; and injecting the compensation current in response to an identified mechanical resonant component of the rotor. Such a method is a closed loop method where the compensation current is injected in response to data from the vibration sensor indicating that there is a resonance.

In this closed loop method, the compensation current may only be injected when an amplitude of the identified mechanical resonant component is above a threshold value. An amplitude of the compensation current may be proportional to an amplitude of the identified mechanical resonant component.

In the closed loop method, the vibration sensor may be an accelerometer.

In any of the above methods, in each of the one or more ranges of rotational speeds of the rotor, the modulated current component may have a frequency at the first frequency when the rotor is rotating at a rotational speed corresponding with a lowest rotational speed within the respective range of rotational speeds of the rotor; and wherein the modulated current component may have a frequency that is at the second frequency when the rotor is rotating at rotational speed corresponding with the highest rotational speed within the respective range of rotational speeds of the rotor.

In each of the one or more ranges of rotational speeds of the rotor, the modulated current component may have a frequency substantially the same as the fundamental mechanical resonant frequency of the rotor at a rotational speed of the rotor corresponding with the respective determined rotational speed.

The first frequency may be lower than the second frequency. Furthermore, the range of frequencies of the modulated current component between the first frequency and second frequency may be based on a percentage change of the rotor fundamental mechanical resonant frequency, and wherein the percentage change of the rotor fundamental mechanical resonant frequency is ±1%, ±5%, ±10%, ±15% or ±20% of the rotor fundamental mechanical resonant frequency.

The alternating current supplied to the plurality of coils may be a three-phase alternating current, and wherein $I_d$ and $I_q$ represent vectored direct current components of the combination of all three-phases.

The axial flux machine may be a motor or a generator.

The present invention also provides a controller for controlling an axial flux machine, the axial flux machine comprising a stator comprising a stator housing enclosing a plurality of stator pole pieces disposed circumferentially at intervals around an axis of the machine, each of the stator pole pieces having a set of coils wound therearound for generating a magnetic field; and a rotor comprising a set of permanent magnets and mounted for rotation about the axis of the machine, the rotor being spaced apart from the stator along the axis of the machine to define a gap between the stator and rotor and in which magnetic flux in the machine is generally in an axial direction, the controller comprising: one or more electrical inputs for receiving one or more electrical currents; one or more electrical outputs for supplying one or more alternating currents to the axial flux machine coils, wherein the controller is configured to: control an alternating current supplied to the plurality of coils to inject a compensation current for reducing a mechanical resonant component of the rotor, the compensation current being injected when the rotor is rotating over one or more ranges of rotational speeds, each of the one or more ranges of rotational speeds of the rotor including a respective determined rotational speed of the rotor, wherein the alternating current through each coil is represented as vectored direct current components comprising a Direct current ($I_d$) component and a Quadrature current ($I_q$) component that are orthogonal to one another, and wherein the compensation current comprises an alternating current component added to at least one of the Quadrature Current ($I_q$) and the Direct Current ($I_d$) components, the modulated current component having an electrical frequency that varies over a range of frequencies between a first frequency and a second frequency depending on the rotational speed of the rotor, the range of frequencies including a frequency that is substantially the same as a fundamental mechanical resonant frequency of the rotor, and a phase that is out of phase with the fundamental mechanical resonant frequency of the rotor.

The one or more respective determined rotational speeds of the rotor may be dependent on one or more respective mechanical resonant excitation orders of the rotor, for example one or more of the $12^{th}$, $18^{th}$, $36^{th}$ and $72^{nd}$ excitation orders. These orders are of interest for certain topologies of machine, for example an 18/12 topology. Other topologies may have other excitation orders that are of interest, for example for a 12/8 machine, the excitation orders may be $8^{th}$, $12^{th}$, $24^{th}$ and $48^{th}$ orders. For a 24/16 topology the $16^{th}$, $24^{th}$, $48^{th}$ and $96^{th}$ orders may be interest.

The one or more respective determined rotational speeds of the rotor is defined by the relationship:

$$\text{determined\_rotational\_speed} = 60 * \frac{\text{rotor\_fundamental\_resonant\_frequency}}{\text{excitation\_order}}$$

Each of the ranges of rotational speed of the rotor may be based on a percentage change of the rotor fundamental mechanical resonant frequency for a given resonant excitation order of the rotor, for example the percentage change of the rotor fundamental mechanical resonant frequency may be ±1%, ±5%, ±10%, ±15% or ±20% of the rotor fundamental mechanical resonant frequency.

The controller may be configured to ramp an amplitude of the compensation current between a lower amplitude and a peak amplitude over at least a portion of the range of rotational speeds of the rotor, and wherein the peak amplitude of the compensation current substantially coincides with the respective determined rotational speed of the rotor.

The controller may also comprise: a vibration sensor input for receiving vibration data from a vibration sensor, the vibration sensor detecting mechanical vibrations in the rotor, wherein the controller is configured to: identify a mechanical resonant component of the rotor from the vibration data; and inject the compensation current in response to an identified mechanical resonant component of the rotor.

The controller may be configured only to inject the compensation current when an amplitude of the identified mechanical resonant component is above a threshold value. An amplitude of the compensation current may be proportional to an amplitude of the identified mechanical resonant component.

The vibration sensor may be an accelerometer.

In each of the one or more ranges of rotational speeds of the rotor, the controller may control the modulated current component to have a frequency at the first frequency when the rotor is rotating at a rotational speed corresponding with a lowest rotational speed within the respective range of rotational speeds of the rotor; and wherein the controller may control the modulated current component to have a frequency that is at the second frequency when the rotor is rotating at rotational speed corresponding with the highest rotational speed within the respective range of rotational speeds of the rotor.

In each of the one or more ranges of rotational speeds of the rotor, the controller may control the modulated current component to have a frequency substantially the same as the fundamental mechanical resonant frequency of the rotor at a rotational speed of the rotor corresponding with the respective determined rotational speed.

The first frequency may be lower than the second frequency. The range of frequencies of the modulated current component between the first frequency and second frequency may be based on a percentage change of the rotor fundamental mechanical resonant frequency, and wherein the percentage change of the rotor fundamental mechanical resonant frequency is ±1%, +5%, ±10%, ±15% or ±20% of the rotor fundamental mechanical resonant frequency.

The one or more alternating currents supplied to the plurality of coils may be a three-phase alternating current, and wherein $I_d$ and $I_q$ represent vectored direct current components of the combination of all three-phases.

The axial flux machine may be a motor or a generator.

The present invention also provides an axial flux machine, comprising: a stator comprising a stator housing enclosing a plurality of stator pole pieces disposed circumferentially at intervals around an axis of the machine, each of the stator pole pieces having a set of coils wound therearound for generating a magnetic field; and a rotor comprising a set of permanent magnets and mounted for rotation about the axis of the machine, the rotor being spaced apart from the stator along the axis of the machine to define a gap between the stator and rotor and in which magnetic flux in the machine is generally in an axial direction, wherein the axial flux machine is coupled to a controller as described above, the controller supplying alternating currents to the plurality of coils.

The axial flux machine may comprise a vibration sensor mounted to the machine for sensing vibrations in the rotor. The vibration sensor may be an accelerometer.

The stator housing may have an annular shape forming a hollow region about the axis of the machine, and wherein the rotor may be formed of an annulus and having a hollow central region about the axis of the machine.

The axial flux machine may comprise a second rotor disposed on an opposite side of the stator to the first rotor, the second rotor comprising a set of permanent magnets on a first side of the second rotor facing the stator, the second rotor being mounted for rotation about the axis of the machine and relative to the stator, the second rotor being spaced apart from the stator along the axis of the machine to define an axial gap between the stator and second rotor and in which magnetic flux in the machine is generally in an axial direction.

The machine may be a motor or a generator.

LIST OF FIGURES

The present invention will now be described, by way of example only, and with reference to the accompanying figures, in which.

DETAILED DESCRIPTION

In brief, we will describe a method and controller 60 for controlling an axial flux machine in which an alternating current supplied to the plurality of coils injects a compensation current to reduce a mechanical resonant component of the rotor. The compensation current is a modulated current component added to at least one of the Quadrature Current ($I_q$) and the Direct Current ($I_d$) components (when the alternating current is represented as a vectored DC component) when the rotor is rotating over one or more ranges of rotational speeds. The modulated current component has an electrical frequency that varies over a range of frequencies between a first frequency and a second frequency depending on the rotational speed of the rotor, the range of frequencies including a frequency that is substantially the same as a fundamental mechanical resonant frequency of the rotor. The phase of the modulated current component is out of phase with the frequency of the fundamental mechanical resonant component of the rotor. For example, if an axial flux machine has a rotor that has a fundamental mechanical resonance of ~1 kHz, a modulated current component having a range of electrical frequencies greater than and less than ~1 kHz are added to the $I_q$ and/or $I_d$ current component, dependent on the rotor speed, in order to reduce the mechanical vibrations of the rotor during use.

Figure 1A:
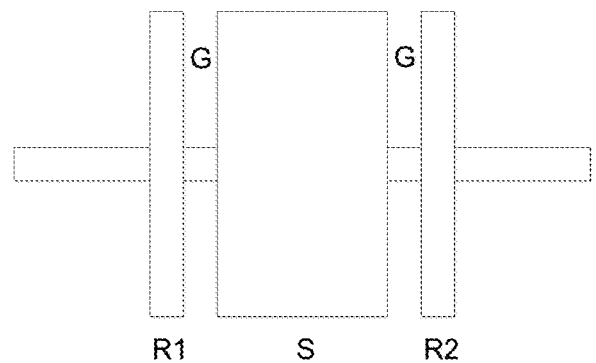
FIGS. 1a to 1c show, respectively, a general configuration of a two-rotor axial flux machine, example topologies for axial flux permanent magnet machines, and a schematic side view of a yokeless and segmented armature (YASA) machine.
Figure 1B:
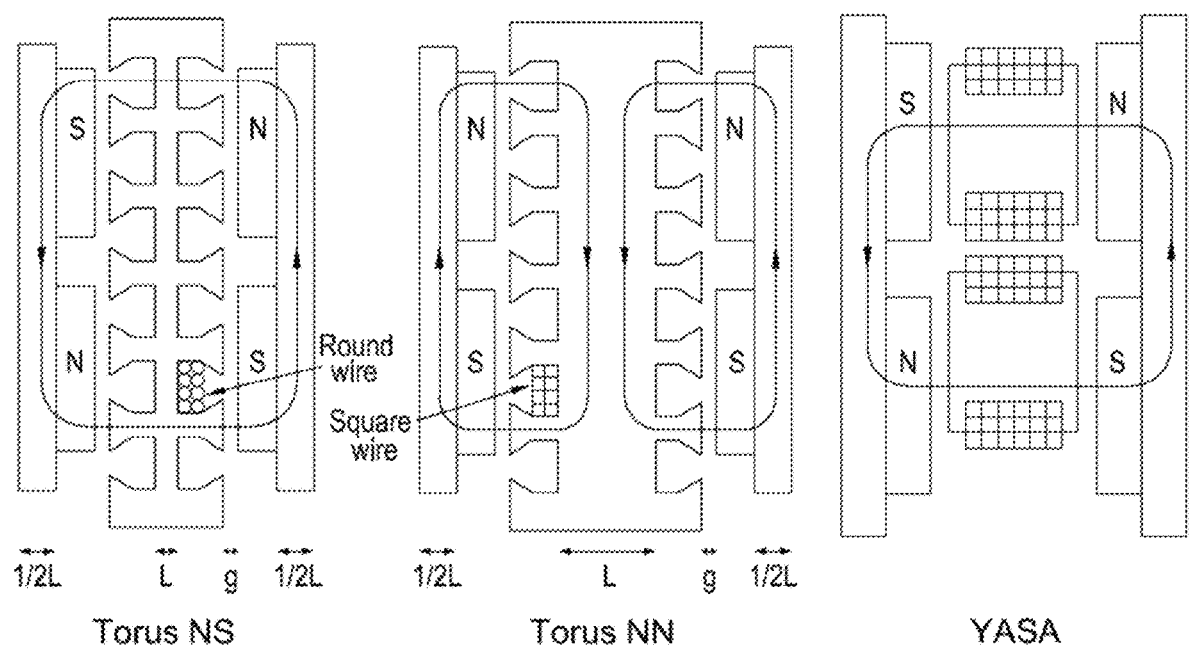
Figure 1C:
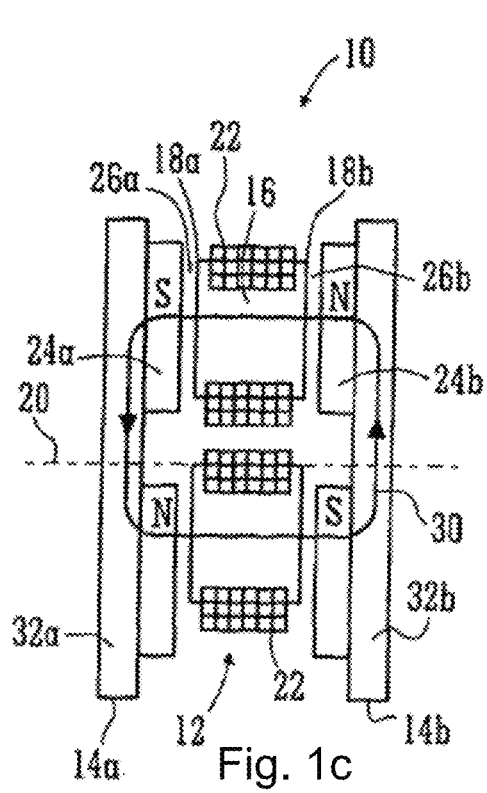
Figure 2:
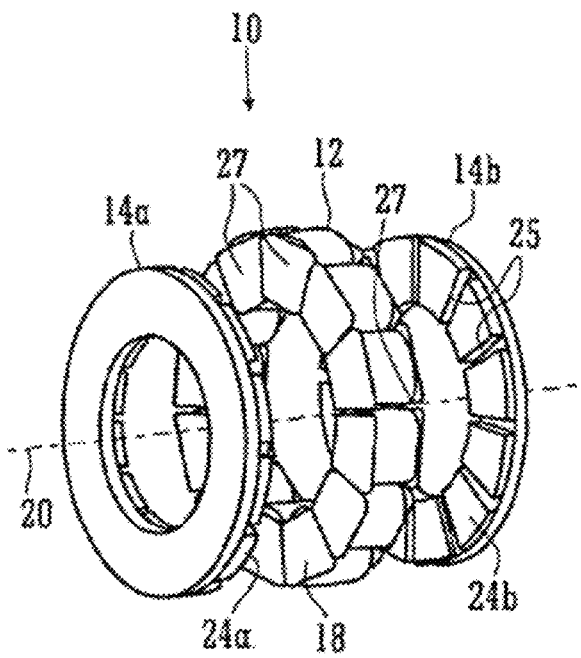
FIG. 2 shows a perspective view of the YASA machine of FIG. 1c.
Figure 3:
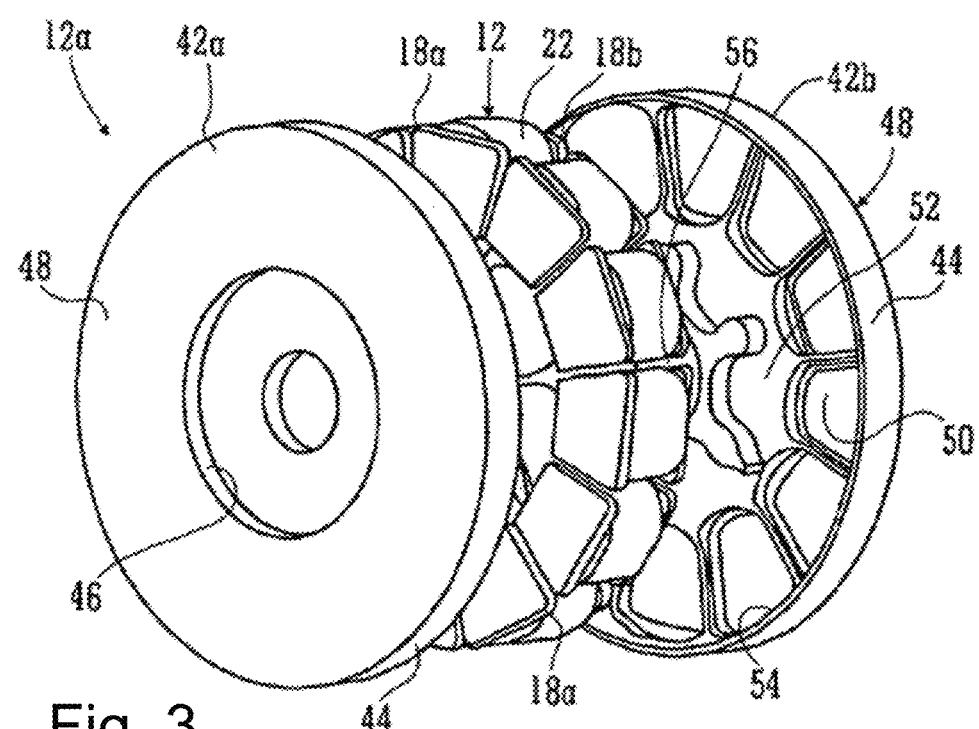
FIG. 3 shows a perspective exploded view of a stator and stator housing for a YASA machine.

We will first discuss the background of the arrangement of axial flux machines, which is an example use of the method and controller of the present invention. Referring first to FIGS. 1c, 2 and 3, which are taken from our PCT application WO2012/022974, FIG. 1c shows a schematic illustration of a yokeless and segmented armature machine 10.

The machine 10 comprises a stator 12 and two rotors 14a,b. The stator 12 is a collection of separate stator bars (or pole pieces) 16 spaced circumferentially about a rotation axis of the rotors 14a,b. Each bar 16 has its own axis (not shown) which is preferably, but not essentially, disposed parallel to the rotation axis 20. Each end of each stator bar is provided with a shoe 18a,b which serves a physical purpose of confining a coil stack 22, which stack 22 is preferably of square/rectangular section insulated wire so that a high fill factor can be achieved. The coils 22 are connected to an electrical circuit (not shown) that, in the case of a motor, energizes the coils so that the poles of the resultant magnetic fields generated by the current flowing in the coils is opposite an adjacent stator coils 22.

The two rotors 14a,b carry permanent magnets 24a, b that face one another with the stator coil 22 between (when the stator bars are inclined—not as shown—the magnets are likewise). Two air gaps 26a,b are disposed between respective shoe and magnet pairs 18a/24a, 18b/24b. There are a number of coils and magnets spaced around the axis of rotation 20 and, preferably, there are a different number of coils and magnets so that the coils do not all come into registration with the corresponding magnet pair at the same time and at the same rotational position of the rotor with respect to the stator. This serves to reduce cogging. The rotors are often disc-shaped and mounted near their centres and having the circumferential edge free and floating about the stator (or in the case where the rotors are annular discs comprising a hole at the centre, they are mounted relative to the stator outward of what is the central rotational axis of the rotor).

In a motor the coils 22 are energized so that their polarity alternates serving to cause coils at different times to align with different magnet pairs, resulting in torque being applied between the rotor and the stator. The rotors 14a,b are generally connected together (for example by a shaft, not shown) and rotate together about the axis 20 relative to the stator 12. The magnetic circuit 30 is provided by two adjacent stator bars 16 and two magnet pairs 24a,b and a back iron 32a,b for each rotor links the flux between the back of each magnet 24a,b facing away from the respective coils 22. The stator coils 16 are enclosed within a housing that extends through the air gap 26a, b and which defines a chamber that may be supplied with a cooling medium.

Turning to FIG. 3, a stator 12a is shown in which the stator coils are located between plastic material clam shells 42a, b that form a stator housing. These clamshells have external cylindrical walls 44, internal cylindrical walls 46, and annular radially disposed walls 48. In the prior art example of FIG. 3 the radial walls 48 include internal pockets 50 to receive the shoes 18a,b of the stator bars 16 and serve to locate the stator coil assemblies 16, 22, 18a,b when the two clam shell housings 42a, b of the stator 12a are assembled together. The stator housing 42a, b defines spaces 52 internally of the coils 22 and externally at 54 around the outside of the coils 22 and there are spaces 56 between the coils. The spaces 52,54,56 are interlinked defining a cooling chamber. Although not shown in FIG. 3, when assembled, the stator housing 42a,b is provided with ports that allow cooling medium such as oil to be pumped into the spaces 52,54,56 to circulate around the coils and cool them.

Whilst we have described a single-stator-double-rotor embodiment, it is also possible to have an axial flux segmented armature design which comprises a single-stator-single-rotor variant. In such an arrangement, a yoke is generally required in place of the removed rotor in order to complete the magnetic return path. However, the remainder of the structure remains the same as the double rotor variant.

Axial flux machines are typically of short axial length made so through having short length stators comprising armatures usually combined with a clockwise distribution of the ferromagnetic pole-piece(s) from which magnetic field is generally in the axial direction and permanent magnet rotor(s) with a generally disc shape format on which clockwise distributed magnets face along the axis opposing electro-generated armature fields. Short stators and disc rotors enable development of (axially) short high torque machines.

As has been mentioned all solid structures have mechanical resonances often excitable by relatively small perturbations and for disc-like rotors. The precise nature of distortion caused by resonance is a function of materials and physical structure, e.g. thickness, ribbing, laminations, etc and particular rotor designs will have mechanical resonances at particular frequencies.

In axial-flux motors effort is given to making rotors stiff with a high flexural modulus, so they overcome significant bending forces of attraction between rotor permanent magnets and opposing stators. Stiffness in the rotor enables small rotor-to-stator air gap. Smaller air gap means higher torque and greater utilisation of magnetic forces, but also runs risk of rotor touch-down on the stator during operation leading to catastrophic failure.

Of special interest for axial flux motors are lower order modes of resonance, because these modes flex rotors over large lengths with respect to rotor dimensions. As the number of flexural nodes increase, stiffness of a rotor will tend to limit large distortions over short distances and adverse mechanical effects of resonance may be avoided. Acoustic noise in the audible spectrum may still be a problem for low and higher order resonance modes.

The Zeroth or fundamental mode of resonance (0,1) is of particular concern as this mode exploits the whole rotor disc with no dividing flexural axis and is one of flexure flapping around the periphery of a rotor disc assuming the centre of the disc is fixed. The zeroth mode is easily excited generating intrusive noise through vibration and because the mode utilises the whole rotor, offers greatest possibility of flexural distortion and potential for a large movement of air, and in turn vibration on the motor cover.

A measurement may be made of the zeroth order resonance mode of a rotor disc for an axial flux machine. Parameters of interest include fundamental resonant frequency, excitation amplitude and force, resultant resonant amplitude of the rotor, temperature of the rotor. One means of excitation is within an axial flux machine in which the rotor forms a component, through finite element modelling, or a rotor may be excited by tapping to find the fundamental mode and frequency of resonance, in a similar fashion to finding the resonance of a cymbal music instrument, a tuning fork or a bell.

The rotor may also be assessed for resonance modes in its usual environment within an axial flux machine 10. The machine 10 is operated from zero revolutions per minute (rpm) to the machine's 10 upper operating range and resonances are measured using a suitable sensor such as an acoustic sensor 68, a vibration sensor 72, or an accelerometer 76.

Figure 4:
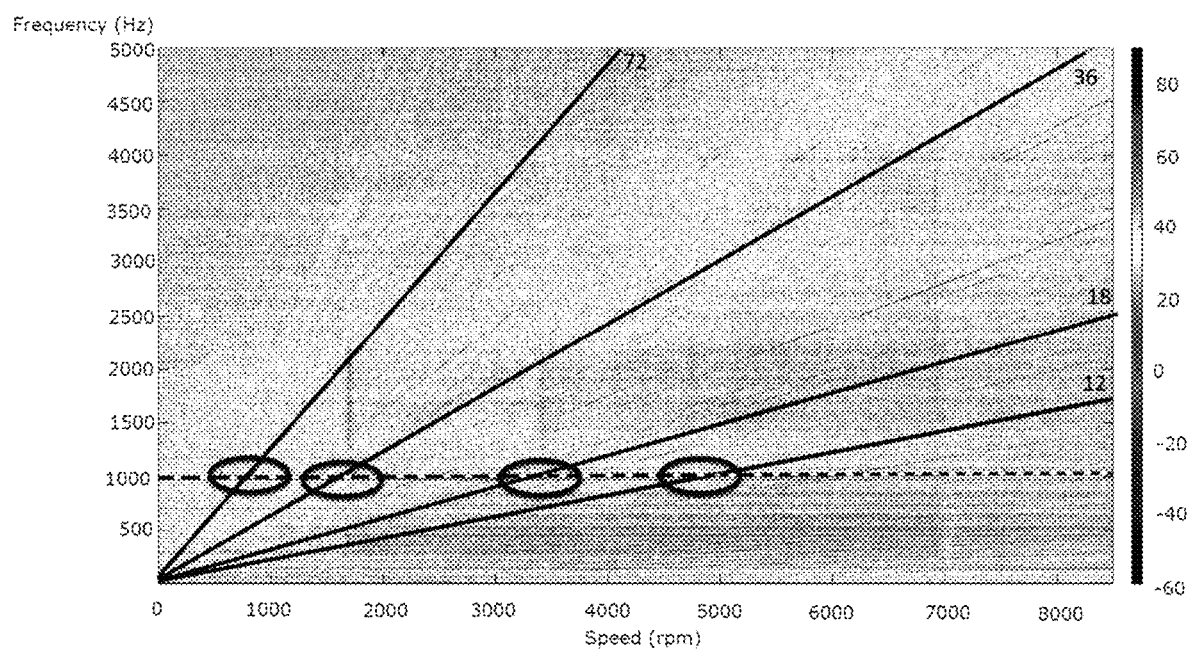
FIG. 4 shows an example waterfall plot of electrical frequency versus rotor rpm versus resonance of a rotor of an axial flux machine.

FIG. 4 shows an example waterfall plot of electrical frequency versus rotor rpm versus resonance of a rotor of an axial flux machine. FIG. 4 shows an electrical excitation frequency on the ordinate versus rotor rpm on the abscissa. Resonance is measured using an acoustic sensor and this information is plotted on the same graph.

A horizontal line is drawn from a point on the ordinate axis corresponding to the zeroth order (fundamental) resonance frequency for the rotor and lines are plotted from the origin i.e. (zero rpm, zero frequency) corresponding to harmonics of the zeroth order resonance mode.

Where the zeroth order resonance frequency line crosses higher order harmonic lines of the zeroth order resonance these crossing points may also correspond to excitation regions giving rise to resonant vibrations. Not all resonant vibrations will cause Noise Vibration & Harshness (NVH) problems and some resonance vibrations may not occur at rpm values of significance in machine use. However where there is correspondence between a machine's normal mode of operation, harmonics of the zeroth order resonant mode, problematic resonance can occur.

For the examples shown in FIG. 4, zeroth order resonances of some significance occur corresponding to $72^{nd}$, $36^{th}$, $18^{th}$ and $12^{th}$ harmonics, which equate to rpm values in the region of 900 rpm, 1,600 rpm, 3,300 rpm and 5,000 rpm respectively in this example, which are clearly well within the operating range of the machine, and would be encountered by the machine as it was accelerated from zero rpm to its maximum operating rpm. It is these vibrations that the present invention is intending to reduce.

The basic idea behind the invention is to reduce mechanical resonance within the rotor (and/or other parts of the system) by introducing an additional electrical current component into the supply of the coils. We will explain this in more detail below.

In operation, the current supplied to the coils to generate the magnetic field (or the electrical current generated by the coils if the machine is run as a generator) is an alternating current supplied by a controller (such as an inverter that has controllable output currents). For the sake of simplicity we shall refer to the machine being run as a motor (so current is being supplied to the coils to generate the magnetic field rather than the rotating rotor causing current to be induced in the coils), but it will be apparent to the skilled reader that the methods described below are also applicable with regards to the machine run in a generator configuration.

The alternating current will be one or more phases, although typically for the machines described herein there are three phases. Neighbouring coils are supplied with a different phase and the (approximately) sinusoidal shape of the alternating current supplied to each of the coils in turn provides a rotating magnetic field that interacts with and drags the permanent magnets of the rotor(s) around.

It is common in the control of axial flux machines to represent the one or more phase alternating currents input into the coils as two vectored direct current components that are orthogonal to one another: know in the field as the Quadrature Current Component ($I_q$) and the Direct Current Component ($I_d$). As such, the combined three phase input currents U, V and W are represented as a single vectored direct current having a direct current Quadrature component $I_q$ and an orthogonal Direct Current component $I_d$. This is achieved using know methods in the field, such as Park transforms. $I_q$ represents useful torque generating current, whereas $I_d$ represents a current that aligns with field induced by the permanent magnets.

Typically, current values for $I_d$ under normal operation of the machine as a motor are less than 10% of $I_q$. For example, in some instances, $I_q$=200 Amps, whereas $I_d$ may be in the region of 10A to 25A.

As mentioned above, the methods described below are appropriate for single and double rotor variants, and are also applicable to axial flux machines that are configured as a motor or a generator, whether these are powered by (or generate) single or multi-phase alternating currents.

The method employed to reduce the mechanical vibrations in the rotor and/or machine comprises controlling the alternating current supplied to the plurality of coils to inject a compensation current for reducing a mechanical resonant component of the rotor.

In the method used in the present invention the controller is controlled to control the supply of the alternating currents supplied to the coils to add a modulated current component to the $I_q$ and/or $I_d$ component. The controller controls the supply of alternating currents such that the modulated current component added to $I_q$ and/or $I_d$ has a range of electrical frequencies, including an electrical frequency that is substantially the same as a fundamental mechanical resonant frequency of the rotor, but out of phase with the fundamental mechanical resonant frequency or the rotor. As discussed above, the modulated $I_q$ and $I_d$ components are injected such that they may have different amplitudes with respect to each other. Whilst it is possible to add the modulated current to the $I_q$ and/or $I_d$ current components, the preferred scheme of the present invention injects the modulated current component into the $I_d$ current component only, since this reduces the possibility of the modulated current component added to $I_q$ presenting as ripple in the torque output of the machine. From herein we shall discuss the modulated current component being added to $I_d$ only, but the reader is reminded that this may be read as $I_q$ and/or $I_d$ current component.

Say for example a fundamental mechanical resonant frequency is 1 kHz, the modulated electrical current added to the $I_d$ direct current component therefore has an electrical frequency range based around 1 kHz. Likewise if the fundamental mechanical frequency is 2 kHz, then a range of electrical frequencies based around 2 kHz modulated current component is added to the $I_d$ direct current component. In practice, the rotors of the machines in question have a resonant mechanical frequency of ~877 Hz, so an electrical modulated current component added to the $I_d$ direct current component would in practice have an electrical frequency range based around ~877 Hz. For the sake of simplicity, though, we will refer to the mechanical resonant frequency of the rotor as being 1 kHz, but it is to be understood that the present invention is not limited to such a frequency. We will discuss the electrical frequency range, which frequency is injected is dependent on the rotational speed of the rotor, below.

Figure 5:
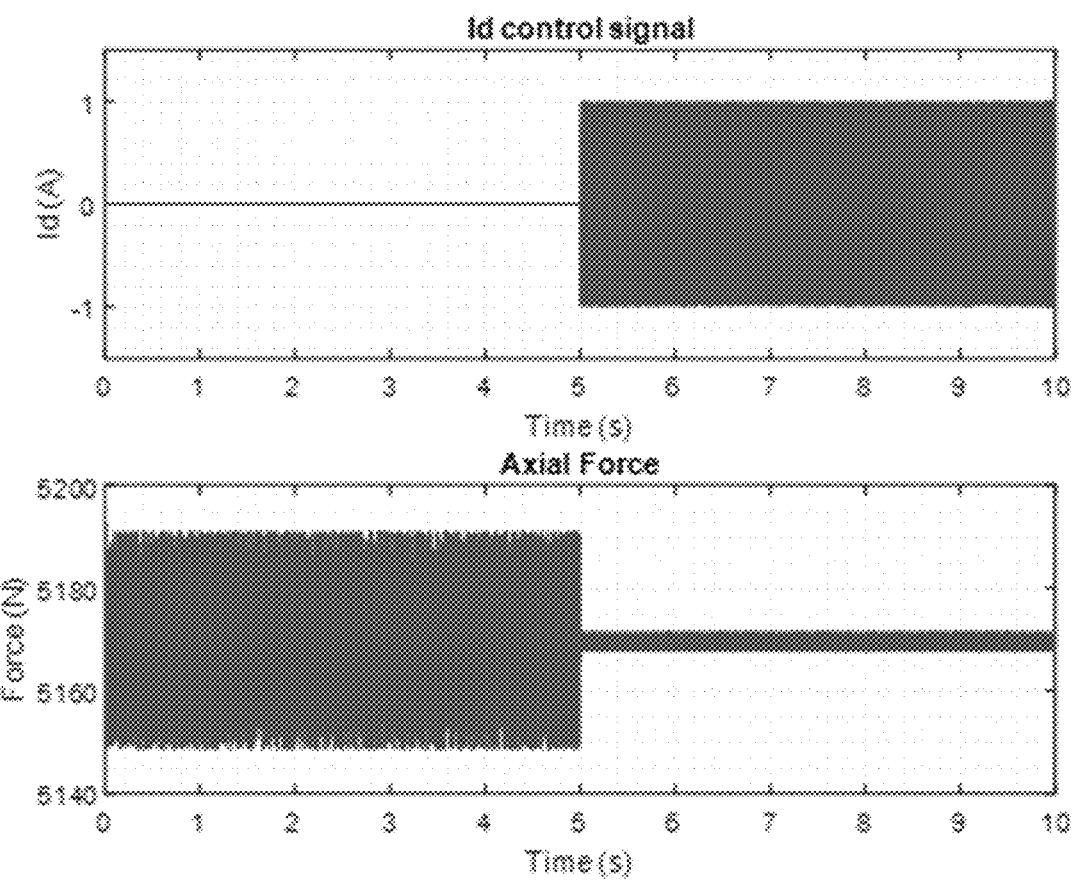
FIG. 5 illustrates a reduction in the resonant forces when applying a modulated component to the $I_d$ direct current component.

FIG. 5 illustrates a reduction in the resonant forces when applying a modulated component to the $I_d$ direct current component in accordance with the invention. The value of $I_d$ is nominally zero between t=0 and t=5 ($I_q$=200 A), indicating that no compensation current is being injected. During this time period, the axial force is shown to have a 42 N peak to peak value, indicating a mechanical resonant component.

At t=5, a modulated current component (having an electrical frequency that is the same as the fundamental mechanical resonant frequency of the rotor) is added to the $I_d$ direct current component. The axial force ripple reduces to a more acceptable level of approximately 4 N peak to peak, indicating a massive reduction in the peak to peak value of resonant forces.

Figure 6:
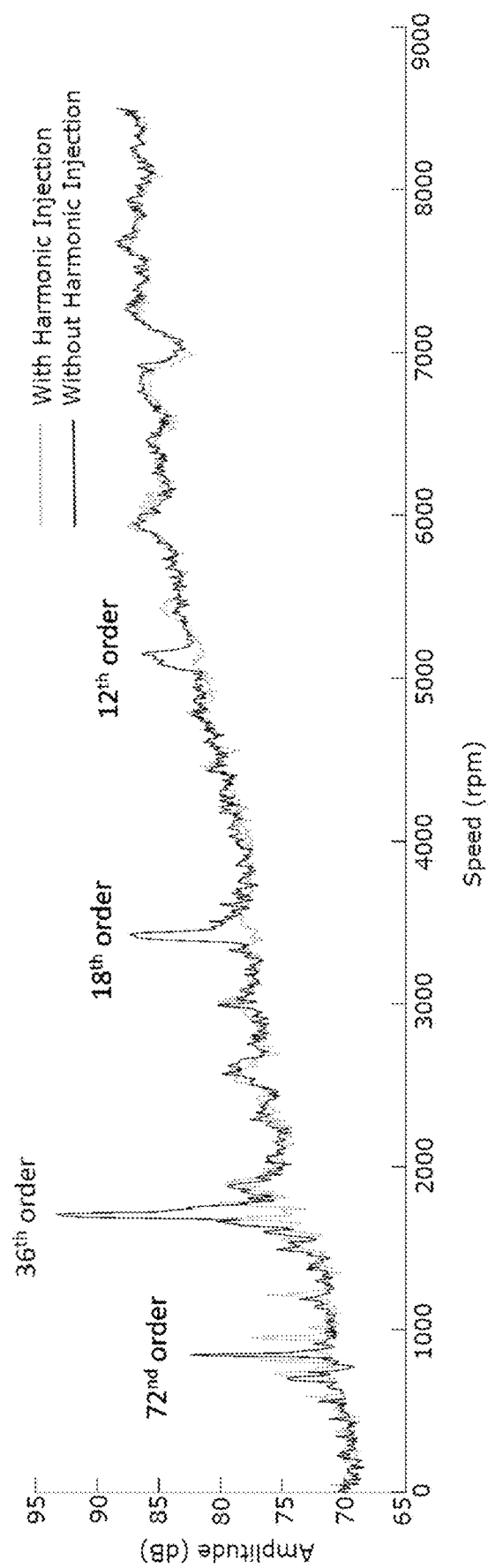
FIG. 6 shows a graph of noise amplitude (dB) versus rotor spinning speed before and after the method of the present invention is implemented.

FIG. 6 shows a graph of noise amplitude (dB) versus rotor spinning speed without the compensation current (darker line) and with the compensation current (grey line).

As can be seen, the darker line comprises peaks in amplitude that coincide with $72^{nd}$, $36^{th}$, $18^{th}$ and $12^{th}$ resonant modes of the rotor ($12^{th}$ order at ~5000 rpm, the $18^{th}$ order at ~3400 rpm, the $36^{th}$ at ~1800 rpm and $72^{nd}$ order at ~850 rpm respectively). This is an axial flux machine being run without the implementation of the present invention.

Applying the compensation current results in the grey line, which can be seen to have much reduced peaks in noise amplitude at the same corresponding resonant modes. Clearly the present invention provides an axial flux machine 10 in which mechanical resonances are much reduced.

Whilst the method could be utilised across all of the machine's 10 intended range of rotor speeds, that is the compensation current is injected into the $I_d$ direct current component for all rotor speeds, this is not practical, since the machine's power requirements will be increased across the whole range. As shown above, the mechanical resonance is most noticeable at certain defined rotor speeds, so the compensation current may not need to be applied across the whole of the operating range of the rotor.

As such, the controller 60 may be configured to apply the compensation current when the rotor is rotating at or around one or more determined rotational speeds of the rotor. The aim here is to reduce the power requirements, since additional current injected into the machine increases the power requirements of the machine (for no noticeable gain in power output since the current is applied to the $I_d$ direct current component rather than the $I_q$ quadrature current component), but still maintain the advantage of reduced mechanical resonances in the rotor.

The one or more determined rotational speeds of the rotor may be dependent on one or more respective resonant excitation orders of the rotor, for example one or more of the $12^{th}$, $18^{th}$, $36^{th}$ and $72^{nd}$ excitation orders. Of course, it would be apparent to the skilled reader that other excitation orders of the rotor may be possible. In the present application, it has been found that these excitation orders are the most prevalent during operation of the machine.

It is noted that the rotational speed (in rpm) may be determined using the following equation:

$$\text{determined\_rotational\_speed} = 60 * \frac{\text{rotor\_fundamental\_resonant\_frequency}}{\text{excitation\_order}} \quad (1)$$

Taking, for example, the above-mentioned mechanical fundamental resonant frequency of 1 kHz for rotor, the determined rotational speed (at which to apply the compensation current) is equal to 60,000 divided by the excitation order. Therefore the determined rotation speeds for the $72^{nd}$, $36^{th}$, $18^{th}$ and $12^{th}$ excitation orders would be (respectively) 833 rpm, 1,666 rpm, 3,333 rpm and 5000 rpm.

As such, when the rotor reaches one or more of these rotational speeds (which can be measured physically through sensors on the rotor or on the output of the rotor, or electrically through the frequency of the supplied currents in a variable frequency machine), the compensation current may be applied in order to reduce the mechanical resonant components of the rotor.

Additionally, for each of the one or more determined rotation speeds of the rotor as described above, the compensation current may be injected over a range of rotational speeds of the rotor centred about the respective determined rotational speed of the rotor. The reasoning behind this is that mechanical resonances do not have a narrow peak centred precisely at the expected rotational speed. The amplitude of the mechanical resonant component ramps up over a range of rotational speeds of the rotor to a peak coinciding at a rotational rotor speed corresponding with expected resonant order, and then tails off as the rotational speed of the rotor moves away from the resonant peak.

One way to determine an appropriate range over which to apply the compensation current is to consider the ranges of rotational speed of the rotor being based on a percentage change of the rotor fundamental mechanical resonant frequency for a given resonant excitation order of the rotor.

Referring again to equation (1), we see the determined speed is proportional to the fundamental resonant frequency of the rotor divided by the excitation order. If we are to consider the fundamental mechanical resonant frequency having a range around the peak of resonance, we can determine a desired range of rotational speeds of the rotor using the range of resonance over which we wish to apply the compensation current for a given excitation order.

The percentage change of the rotor fundamental mechanical resonant frequency may for example be ±1%, ±5%, ±10%, ±15% or ±20% of the rotor fundamental mechanical resonant frequency, or it may be greater than this, or between these ranges. In practice a value of ±10% provides a suitable range of rotor speeds over which to apply the compensation current. That is, the determined rotor speeds are calculated between (±10% of 1 kHz=) 900 Hz and 1.1 kHz.

Using the figures described above using equation (1), we would arrive at the following ranges for rotor speeds (rpm):

| Resonant Order | Lower rotor speed | Peak resonant rotor speed | Upper rotor speed |
| --- | --- | --- | --- |
| $12^{th}$ | 4,500 | 5,000 | 5,500 |
| $18^{th}$ | 3,000 | 3,333 | 3,666 |
| $36^{th}$ | 1,500 | 1,666 | 1,833 |
| $72^{nd}$ | 750 | 833 | 916 |

Whilst we have described applying the compensation current over multiple relatively narrow ranges of rotational speeds of the rotor, it may be possible to apply the compensation currents over one or more different ranges.

For example, one could choose one resonant order (of most interest to reduce NVH for that machine's topology) to focus on. With this one resonant order, a compensation current may be added over a relatively narrow range of rotational speeds of the rotor (as above, but, say for example, focussing only on the $36^{th}$ order). Alternatively, the compensation current may be added over a very broad range of rotational speeds of the rotor, for example between 0 rpm and the maximum rpm of the rotor.

As another example, the compensation current may be applied over multiple broader ranges (than described above). That is, each range around each of the one or more resonant orders may be greater than the ±20% described above.

As mentioned above, the frequency of the modulated current component added to the $I_d$ direct current component is varied over each of the one or more ranges of rotational speeds. By this we mean that, corresponding to the lowest rotational rotor speed of each of the ranges, a first electrical frequency is chosen. For the highest rotational rotor speed of each of the ranges, a second electrical frequency is chosen. For the anticipated peak resonant rotor speed, the electrical frequency is chosen to be substantially the same as the mechanical resonant frequency of the rotor. The first and second electrical frequencies represent respectively the lower and upper frequencies within a range of frequencies.

This range of frequencies may for example be ±1%, ±5%, ±10%, ±15% or ±20% of the rotor fundamental mechanical resonant frequency, or it may be greater than this, or between these ranges. In practice a value of ±10% provides a suitable range of electrical frequencies. That is, depending on the rotor's rotational speed, and based on a fundamental mechanical resonant component of 1 kHz, the electrical frequency range may be between (±10% of 1 kHz=) 900 Hz and 1.1 kHz.

Given the example table or rotational speeds above, the modulated current component therefore has a frequency of 900 Hz at the lowest rotational speeds of each of the ranges of rotational speeds, 1.1 kHz at the highest rotational speeds of each of the ranges of rotational speeds, and 1 kHz at the anticipated resonant peak rotational speed. The frequency is varied within this range of 900 Hz to 1.1 kHz dependent on the rotational speed of the rotor throughout each of the ranges.

As well as applying the compensation current over a range of rotational speeds of the rotor, over that range the amplitude of the modulated current added to the $I_d$ direct current component may be varied over the range of rotational speeds. It may be ramped between a lower amplitude and a peak amplitude over at least a portion of the range of rotational speeds of the rotor. It would be preferable for the amplitude to follow the amplitude of resonance across the range, that is increasing from a lower value at the lower rotational speed, increasing to a peak coinciding at the resonant peak, and then tailing back off to a lower value as the rotational speed reaches the upper end of the rotational rotor speed range.

In an open loop control scheme, where the above rotor speed values are stored in memory 64 and referred to by the controller 60, a simple scheme of increasing from a lower value of amplitude of the compensation current at the lower rotor speed, achieving a peak amplitude of compensation current at the resonant rotor speed and then decreasing amplitude of compensation current until it reaches the upper rotor speed is possible. The amplitude may ramp up and down linearly, or it may be shaped as appropriate. Furthermore, the modulated current component is preferably out of phase with the mechanical resonant component of the rotor (to prevent the control scheme adding to the resonance, rather than reducing the resonance). The preference is to have the modulated component completely in antiphase to the mechanical resonant component of the rotor, however the control scheme will work so long as the modulated component is at least partially out of phase with the mechanical resonant component of the rotor.

In an open loop scheme, the measure of the phase is characterised during manufacture, and the value stored in memory 64 to enable the controller 60 to apply the correct modulation to the $I_d$ direct current. Whilst it is preferred that the modulated current component is injected to have a response that is in complete antiphase to the mechanical resonant component of the rotor (in order to effect maximum reduction of the resonance of the rotor), it is understood that with an open loop control scheme this may not be possible over the lifetime of the machine. Over time, the mechanical characteristics of the components may change, causing a drift in the phase characteristics of the resonance. So long as the injected modulated current component is at least partly out of phase with the mechanical resonant component of the rotor, some reduction in the resonance of the rotor will occur when the modulated current component is injected.

In an open loop control scheme, the controller 60 may calculate the appropriate rotor speeds over which to apply the compensation current based on manufacturer installed values such as the fundamental mechanical resonant frequency component (which will be based on a characterisation of the machine at the time of manufacture) and the desired excitation modes. They may be calculated during operation of the machine 10. Alternatively, these rotational values may be provided at the point of manufacture as a look up table to which the controller refers during operation of the control scheme.

An alternative to the open loop control scheme is to utilise a closed loop control scheme. In such a scheme, the machine is provided with a vibration sensor 72, such as an accelerometer. The vibration sensor 72 is preferably mechanically mounted relative to the rotor (for example mounted on a cover near to or adjacent the rotor, or another mechanical component near to or adjacent the rotor) such that it is able to sense mechanical vibrations of the rotor, and in particular resonant vibrations, in the rotor.

The closed loop scheme utilises the data provided by the vibration sensor 72 in order to detect mechanical resonant peaks of the rotor as the speed of the rotor is varied. As such, the controller 60 injects the compensation current in response to an identified mechanical resonant component of the rotor. Furthermore, since in the closed loop scheme the controller 60 knows when resonance is occurring, it will also have a measure of the phase of the resonance. As such, a suitable modulated current component may be injected into the $I_d$ direct current component having a suitable frequency and phase that is out of phase (preferably antiphase) with the mechanical resonant component. Although, as discussed above with relation to the open loop scheme, so long as the phase is at least partially out of phase with the mechanical resonant component of the rotor, some reduction in the resonance will occur. As above, the frequency of the modulated current component is varied across a range of frequencies that include the fundamental mechanical resonant frequency of the rotor, dependent on the rotational speed of the rotor.

The compensation current may be injected only when an amplitude of the identified mechanical resonant component is above a threshold value. Again, this improves the power requirements of the machine as the compensation current is only injected where there is a need to compensate for mechanical resonant components.

Since there is a direct measurement of the resonance occurring in the rotor at various speeds, the controller 60 may apply the compensation current at an amplitude of the compensation current that is proportional to an amplitude of the identified mechanical resonant component.

Using a closed-loop scheme is advantageous as a machine's 10 performance may change over its life. As such, the resonant peaks may move as the components age. However, this comes at the added cost of additional components (the vibration sensor) and the additional computational power required to monitor the vibration sensor data, determine the peaks in resonance and apply the appropriate compensation current.

Figure 7:
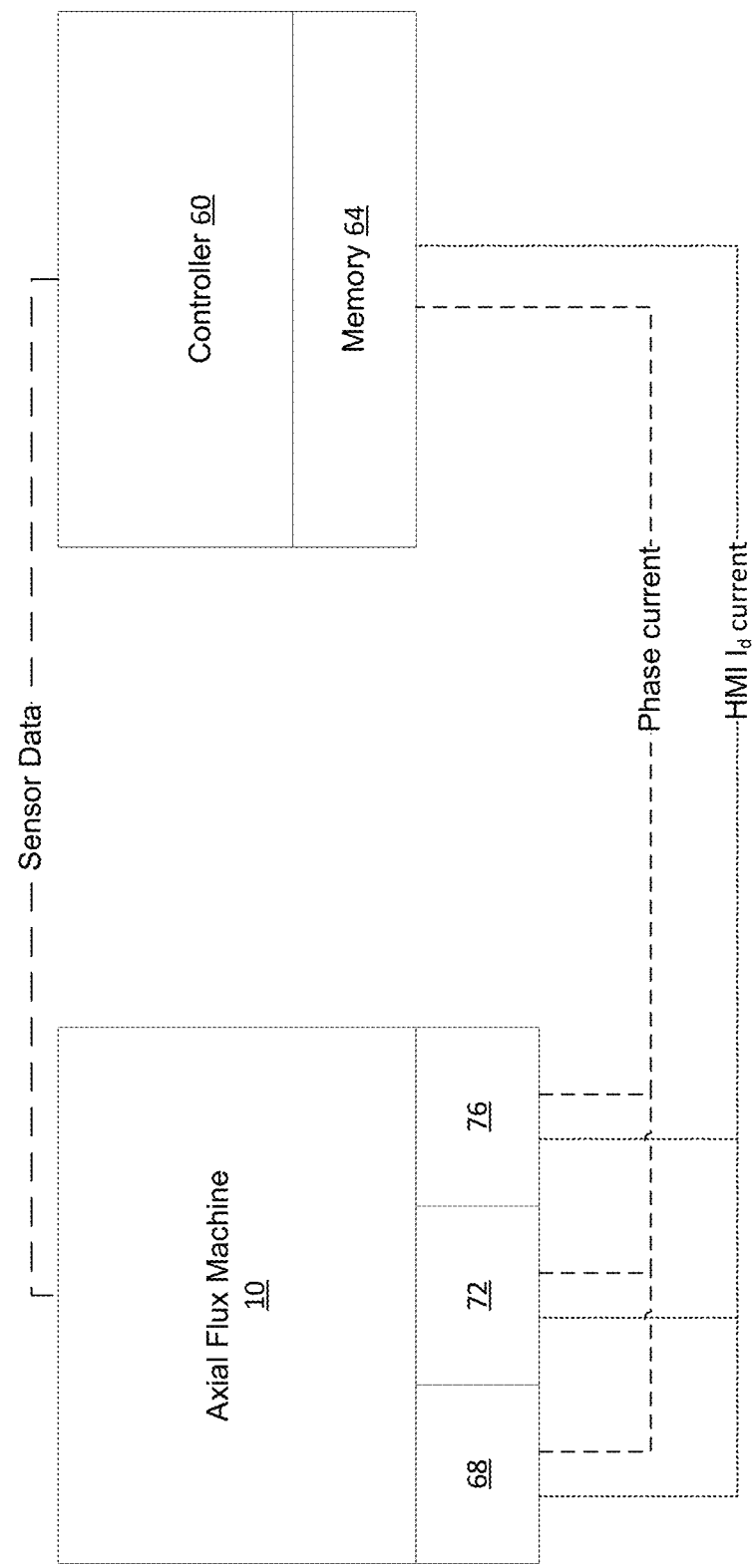
FIG. 7 shows a schematic diagram of an axial flux machine, a controller, and sensors configured to implement methods discussed herein, according to some implementations.

As shown in FIG. 7, the control schemes (e.g., the open-loop scheme and the closed loop scheme) and methods discussed herein can be implemented according to various implementations with the controller 60. In various implementations, the controller 60 may include the memory device 64, an inverter configured for producing an alternating current output (e.g., a compensation current), and at least one processor configured for controlling the inverter's alternating current output. As depicted in FIG. 7, the controller 60 receives sensor data from the acoustic sensor 68, the vibration sensor 72, and/or the accelerometer 76. In response to the received sensor data, the controller's processor then controls the inverter to inject a compensation current (or otherwise control the power delivered by the inverter) to the axial flux machine 10 during operation.

Whilst the discussion above has been in relation to a motor having an 18/12 topology (18 pole pieces and 12 poles), in which the $12^{th}$, $18^{th}$, $36^{th}$, and $72^{nd}$ excitation orders are most of interest, the above techniques may also be used in other topologies. For example a 12/8 topology (12 pole pieces and 8 poles), in which the $8^{th}$, $12^{th}$, $24^{th}$ and $48^{th}$ orders are of most interest, and a 24/16 topology (24 pole pieces and 16 poles), in which the $16^{th}$, $24^{th}$, $48^{th}$ and $96^{th}$ orders are of most interest. Other topologies may be known to the skilled. Using the techniques described above, mechanical resonances in the rotor of machines having these alternative topologies may be reduced.

No doubt many other effective alternatives will occur to the skilled person. It will be understood that the invention is not limited to the described embodiments and encompasses modifications apparent to those skilled in the art lying within the scope of the claims appended hereto.

The invention claimed is:

1. A method of controlling an axial flux machine, the axial flux machine comprising a stator comprising a stator housing enclosing a plurality of stator pole pieces disposed circumferentially at intervals around an axis of the machine, each of the stator pole pieces having a set of coils wound therearound for generating a magnetic field; and a rotor comprising a set of permanent magnets and mounted for rotation about the axis of the machine, the rotor being spaced apart from the stator along the axis of the machine to define a gap between the stator and rotor and in which magnetic flux in the machine is generally in an axial direction, the method comprising:
controlling an alternating current supplied to the plurality of coils to inject a compensation current for reducing a mechanical resonant component of the rotor, the compensation current being injected when the rotor is rotating over one or more ranges of rotational speeds, each of the one or more ranges of rotational speeds of the rotor including a respective determined rotational speed of the rotor,
wherein the alternating current through each coil is represented as vectored direct current components comprising a Direct current ($I_d$) component and a Quadrature current ($I_q$) component that are orthogonal to one another, and
wherein the compensation current comprises a modulated current component added to the Direct Current ($I_d$) components, the modulated current component having an electrical frequency that varies over a range of frequencies between a first frequency and a second frequency depending on the rotational speed of the rotor, the range of frequencies including a frequency that is substantially the same as a fundamental mechanical resonant frequency of the rotor; and a phase that is out of phase with the fundamental mechanical resonant frequency of the rotor.

2. The method according to claim 1, wherein the one or more respective determined rotational speeds of the rotor is dependent on one or more respective mechanical resonant excitation orders of the rotor.

3. The method according to claim 2, wherein the one or more respective determined rotational speeds of the rotor is defined by the relationship:

$$\text{determined\_rotational\_speed} = 60 * \frac{\text{rotor\_fundamental\_resonant\_frequency}}{\text{excitation\_order}}.$$

4. The method according to claim 1, wherein each of the ranges of rotational speed of the rotor is based on a percentage change of the rotor fundamental mechanical resonant frequency for a given mechanical resonant excitation order of the rotor.

5. The method according to claim 1, comprising:
receiving vibration data from a vibration sensor, the vibration sensor detecting mechanical vibrations in the rotor;
identifying a mechanical resonant component of the rotor from the vibration data; and
injecting the compensation current in response to an identified mechanical resonant component of the rotor.

6. The method according to claim 1, wherein, in each of the one or more ranges of rotational speeds of the rotor, the modulated current component has a frequency at the first frequency when the rotor is rotating at a rotational speed corresponding with a lowest rotational speed within the respective range of rotational speeds of the rotor; and
wherein the modulated current component has a frequency that is at the second frequency when the rotor is rotating at rotational speed corresponding with the highest rotational speed within the respective range of rotational speeds of the rotor.

7. The method according to claim 1, wherein, in each of the one or more ranges of rotational speeds of the rotor, the modulated current component has a frequency substantially the same as the fundamental mechanical resonant frequency of the rotor at a rotational speed of the rotor corresponding with the respective determined rotational speed.

8. The method according to claim 6, wherein the range of frequencies of the modulated current component between the first frequency and second frequency is based on a percentage change of the rotor fundamental mechanical resonant frequency, and wherein the percentage change of the rotor fundamental mechanical resonant frequency is ±1%, ±5%, ±10%, ±15% or ±20% of the rotor fundamental mechanical resonant frequency.

9. The method according to claim 1, wherein the alternating current supplied to the plurality of coils is a three-phase alternating current, and wherein $I_d$ and $I_q$ represent vectored direct current components of the combination of all three-phases.

10. A controller for controlling an axial flux machine, the axial flux machine comprising a stator comprising a stator housing enclosing a plurality of stator pole pieces disposed circumferentially at intervals around an axis of the machine, each of the stator pole pieces having a set of coils wound therearound for generating a magnetic field; and a rotor comprising a set of permanent magnets and mounted for rotation about the axis of the machine, the rotor being spaced apart from the stator along the axis of the machine to define a gap between the stator and rotor and in which magnetic flux in the machine is generally in an axial direction, the controller comprising:
   one or more electrical inputs for receiving one or more electrical currents;
   one or more electrical outputs for supplying one or more alternating currents to the axial flux machine coils,
   wherein the controller is configured to:
      control an alternating current supplied to the plurality of coils to inject a compensation current for reducing a mechanical resonant component of the rotor, the compensation current being injected when the rotor is rotating over one or more ranges of rotational speeds, each of the one or more ranges of rotational speeds of the rotor including a respective determined rotational speed of the rotor,
   wherein the alternating current through each coil is represented as vectored direct current components comprising a Direct current ($I_d$) component and a Quadrature current ($I_q$) component that are orthogonal to one another, and
   wherein the compensation current comprises an alternating current component added to the Direct Current ($I_d$) components, the modulated current component having an electrical frequency that varies over a range of frequencies between a first frequency and a second frequency depending on the rotational speed of the rotor, the range of frequencies including a frequency that is substantially the same as a fundamental mechanical resonant frequency of the rotor, and a phase that is out of phase with the fundamental mechanical resonant frequency of the rotor.

11. The controller according to claim 10, wherein the one or more respective determined rotational speeds of the rotor is dependent on one or more respective mechanical resonant excitation orders of the rotor.

12. The controller according to claim 11, wherein the one or more respective determined rotational speeds of the rotor is defined by the relationship:

$$\text{determined\_rotational\_speed} = 60 * \frac{\text{rotor\_fundamental\_resonant\_frequency}}{\text{excitation\_order}}.$$

13. The controller according to claim 10, wherein each of the ranges of rotational speed of the rotor is based on a percentage change of the rotor fundamental mechanical resonant frequency for a given resonant excitation order of the rotor.

14. The controller according to claim 10, comprising:
   a vibration sensor input for receiving vibration data from a vibration sensor, the vibration sensor detecting mechanical vibrations in the rotor,
   wherein the controller is configured to:
      identify a mechanical resonant component of the rotor from the vibration data; and
      inject the compensation current in response to an identified mechanical resonant component of the rotor.

15. The controller according to claim 10, wherein, in each of the one or more ranges of rotational speeds of the rotor, the controller controls the modulated current component to have a frequency at the first frequency when the rotor is rotating at a rotational speed corresponding with a lowest rotational speed within the respective range of rotational speeds of the rotor; and
   wherein the controller controls the modulated current component to have a frequency that is at the second frequency when the rotor is rotating at rotational speed corresponding with the highest rotational speed within the respective range of rotational speeds of the rotor.

16. The controller according to claim 10, wherein, in each of the one or more ranges of rotational speeds of the rotor, the controller controls the modulated current component to have a frequency substantially the same as the fundamental mechanical resonant frequency of the rotor at a rotational speed of the rotor corresponding with the respective determined rotational speed.

17. The controller according to claim 15, wherein the range of frequencies of the modulated current component between the first frequency and second frequency is based on a percentage change of the rotor fundamental mechanical resonant frequency, and wherein the percentage change of the rotor fundamental mechanical resonant frequency is ±1%, ±5%, ±10%, ±15% or ±20% of the rotor fundamental mechanical resonant frequency.

18. The controller according to claim 10, wherein the one or more alternating currents supplied to the plurality of coils are a three-phase alternating current, and wherein $I_d$ and $I_q$ represent vectored direct current components of the combination of all three-phases.

19. An axial flux machine, comprising:
   a stator comprising a stator housing enclosing a plurality of stator pole pieces disposed circumferentially at intervals around an axis of the machine, each of the stator pole pieces having a set of coils wound therearound for generating a magnetic field; and
   a rotor comprising a set of permanent magnets and mounted for rotation about the axis of the machine, the rotor being spaced apart from the stator along the axis of the machine to define a gap between the stator and rotor and in which magnetic flux in the machine is generally in an axial direction,
   wherein the axial flux machine is coupled to the controller according to claim 10, the controller supplying alternating currents to the plurality of coils.

20. The axial flux machine according to claim 19, comprising a vibration sensor mounted to the machine for sensing vibrations in the rotor.

21. The axial flux machine according to claim 19, wherein the stator housing has an annular shape forming a hollow region about the axis of the machine, and wherein the rotor is formed of an annulus and having a hollow central region about the axis of the machine.

22. The axial flux machine according to claim 19, comprising a second rotor disposed on an opposite side of the stator to the first rotor, the second rotor comprising a set of permanent magnets on a first side of the second rotor facing the stator, the second rotor being mounted for rotation about the axis of the machine and relative to the stator, the second rotor being spaced apart from the stator along the axis of the machine to define an axial gap between the stator and second rotor and in which magnetic flux in the machine is generally in an axial direction.

* * * * *